United States Patent [19]
Guenther

[11] Patent Number: 5,393,931
[45] Date of Patent: Feb. 28, 1995

[54] ELECTRICAL ACCESS TO A HERMETICALLY SEALED CHAMBER USING A PRINTED CIRCUIT BOARD

[75] Inventor: Derek P. Guenther, Tucson, Ariz.

[73] Assignee: Photmetrics, Ltd., Tucson, Ariz.

[21] Appl. No.: 27,297

[22] Filed: Mar. 4, 1993

[51] Int. Cl.⁶ ............................................. H05K 5/06
[52] U.S. Cl. ................................... 174/52.3; 361/752
[58] Field of Search ........................... 174/52.4, 52.3; 156/285, 286, 292, 330; 361/600, 736, 741, 748, 756, 752, 760, 767, 772, 777, 803

[56] References Cited

U.S. PATENT DOCUMENTS

| | | | |
|---|---|---|---|
| 3,904,262 | 9/1975 | Cutchaw | 339/75 MP |
| 4,159,221 | 6/1979 | Schuessler | 156/285 |
| 4,920,454 | 4/1990 | Stopper et al. | 174/52.4 X |
| 5,025,114 | 6/1991 | Braden | 174/52.4 |

Primary Examiner—Leo P. Picard
Assistant Examiner—Christopher Horgan
Attorney, Agent, or Firm—Herbert M. Shapiro

[57] ABSTRACT

A vacuum chamber housing a cooled CCD for a CCD camera has a hermetic seal provided by a closed loop pattern on the surface of a laminate, printed circuit board having subteranean conductor traces. Electrical access to the CCD is provided, via the traces, by a universal pattern of pivouts subsets of which correspond to the pin patterns of different CCDs. Large numbers of pin connection patterns are achieved by this technique without leaks. A single board embodiment and a mother-daughter board embodiment are described.

7 Claims, 3 Drawing Sheets

ELECTRICAL ACCESS TO A HERMETICALLY SEALED CHAMBER USING A PRINTED CIRCUIT BOARD

FIELD OF THE INVENTION

This invention relates to hermetically sealed chambers and electrical access to components located within such a chamber.

BACKGROUND OF THE INVENTION

Sealed chambers housing electronic components which have to be cooled, for example, are common. In electronic cameras, for example, Charge-coupled Devices (CCDs) are maintained in such chambers to reduce noise. Access to such a component requires a significant number of electrical conductors to penetrate the seal leading to leaks in the seal. Of course, as the requisite number of conductors increases, the potential for leaks increases leading too costly yield and repair problems.

Conductors typically have access to a sealed chamber through commercially available connectors which are sealed with glass although such connectors have proven adequate for relatively small numbers of through connections, they are expensive and have given rise to significant leakage problems as the number of conductors increases. For CCD cameras the problem becomes increasingly acute if one considers a modular camera capable of utilizing on e set of electronics to operate many different types of CCDs. Such a modular camera is less expensive to service since repairs can be made without requiring the entire camera to be returned to the manufacturer accepting replacement camera heads without returning the camera to the manufacturer and without requiring removal and replacement of components. The reason for the problem is that CCDs are considerably different from one another requiring different pin configurations. Thus, a modular camera system which could accept a replacement camera head would have to have dozens of conductors penetrate the sealed chamber, a requirement which could not be met competitively by present glass sealed connectors.

BRIEF DESCRIPTION OF ILLUSTRATIVE EMBODIMENTS OF THIS INVENTION

In accordance with the principles of this invention, a laminate, printed circuit board, with subterranean conductor traces, is used to define conductor access to a hermetically sealed chamber, A closed loop seat is formed on each surface of the printed circuit board to which the piece parts for the sealed chamber are mated. Electrical connection is obtained for significant numbers of different CCD configurations to permit a modular CCD camera system to be realized, For such a system, the camera head includes a memory which stores the operational parameters of the CCD in each head and a camera body, adapted to accept any such modular head, includes circuitry which accepts the operational parameter information and reconfigures itself to operate with the replacement CCD.

The use of a printed circuit board for providing electrical access to a hermetically sealed chamber is considered a significant departure from prior art techniques for accessing, for example, a CCD housed in an evacuated and hermetically sealed chamber in a CCD camera head.

In one embodiment, an O-ring land of Nickel plated Copper is formed on each of the opposing surfaces of a printed circuit board. The board includes eight layers of Polyimide with traces of Copper between the layers. The sealed chamber is attached to the lands via O-rings.

In another embodiment, one printed circuit board is used as above and a second printed circuit board is used to connect to the first board in a mother-daughter configuration. A universal pin arrangement is defined on the mother board and each daughter board has a pin configuration for different CCDs.

The printed circuit board includes a labyrinth of through slots to provide thermal isolation for the sealed chamber.

DETAILED DESCRIPTION OF ILLUSTRATIVE EMBODIMENTS OF THIS INVENTION

Figure 1:
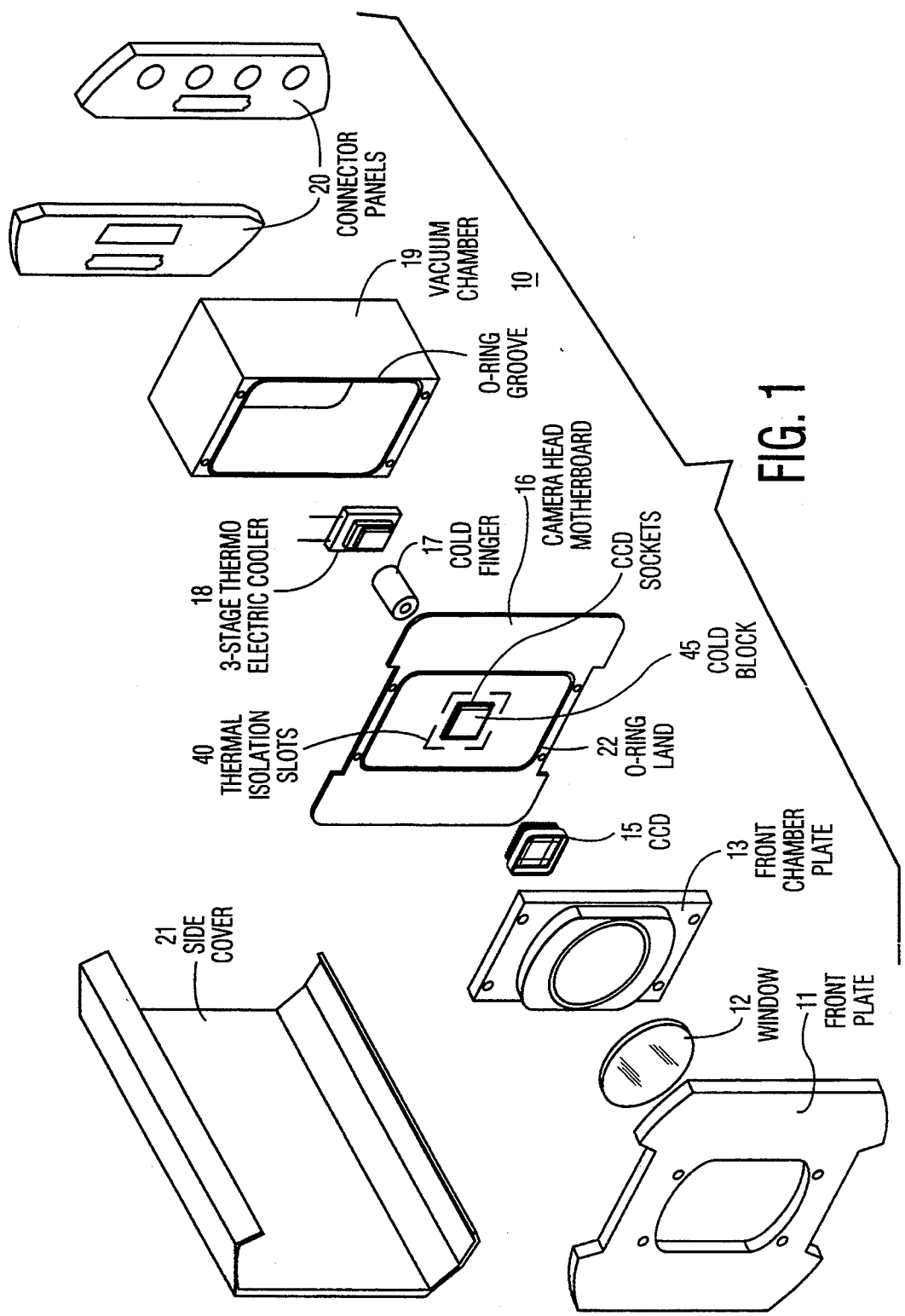
FIG. 1 is an exploded, schematic view of CCD camera head housing a CCD imager and showing a printed circuit board with surface lands for attachment to a sealed chamber.

Fig. 1 shows an exploded view of a CCD camera head 10. The head comprises an assemblage of components including, from left to right as viewed, a front plate 11, a window 12, a front chamber plate 13, a CCD subassembly 15 with mounting and pin out arrangements as shown, a camera head mother board 16, a cold "finger" 17, a thermoelectric cooler 18, a vacuum chamber 19, and connector panels 20 for attachment to a camera body. Side covers (21) enclose the assemblage of components.

The subassembly of the camera head involves the placement of the CCD subassembly within the vacuum chamber, the implementation of a means for cooling the CCD to reduce noise, and the provision for accepting replacement CCDs with different pin out configurations. As can be seen from the figure, the vacuum chamber is formed by attaching front chamber plate 13, with window 12 in place, to vacuum chamber 19. This attachment, as is also clear from the figure, sandwiches mother board 16 between components 13 and 19. The problem thus encountered is to provide a means for maintaining a vacuum within the vacuum chamber yet allowing for accessing electrical paths for different CCD pin out configurations while still maintaining a leak proof environment.

The provision of a relatively large number of electrical paths through the seal without leaks was achieved by employing a printed circuit board (16) with CCD pin sockets 21 and an O-ring land 22 for accepting CCDs with different pin configurations and also accepting front chamber plate 13 and vacuum chamber 19 in a sealed manner.

Electrical paths for the various pin configurations are provided by subteranean conductor traces in the printed circuit board. For the wide variety of CCD pin configurations, as multiple layers, typically eight to twelve, may be required in the printed circuit board (16) if a single board is employed. The actual trace designs differ depending on the choice of acceptable CCDs and can be determined by one skilled in the art. Accordingly, such trace layouts are not shown in detail here.

Figure 2:
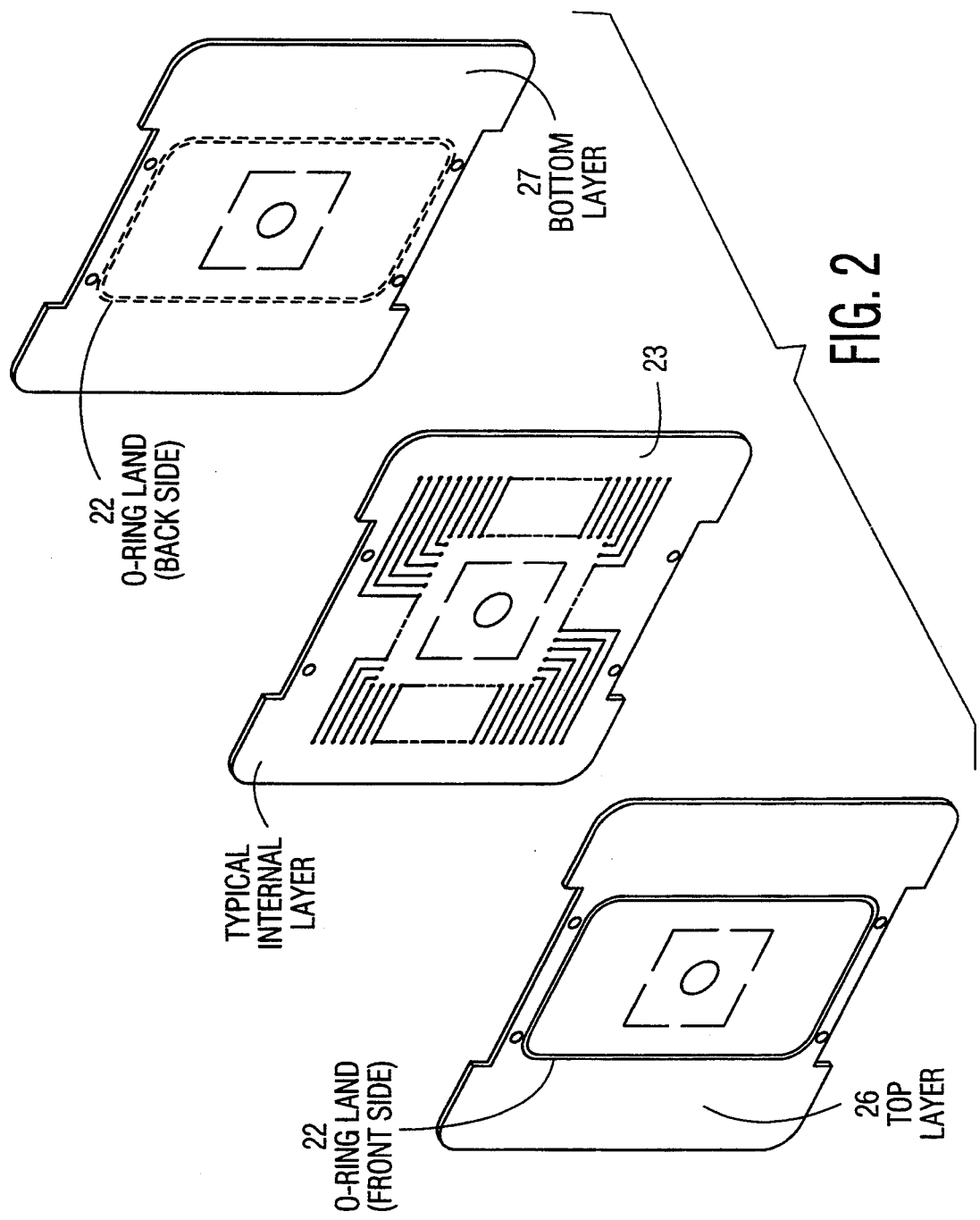
FIG. 2 is an exploded view of the printed circuit board of FIG. 1 showing a representative subteranean trace and pin arrangement for accepting different CCD arrays.

FIG. 2 shows an exploded view of printed a circuit board with an internal layer 23 sandwiched between a top layer 26 and a bottom layer 27. As can be seen from the figure, a large number of Copper traces, typically fifty to sixty, are needed to accomodate the variety of CCDs which are acceptable for potential use in the camera head. The board can be seen to include an O-ring land (22) on the front side of top layer 26 and the back side,of the bottom layer 27.

Figure 3:
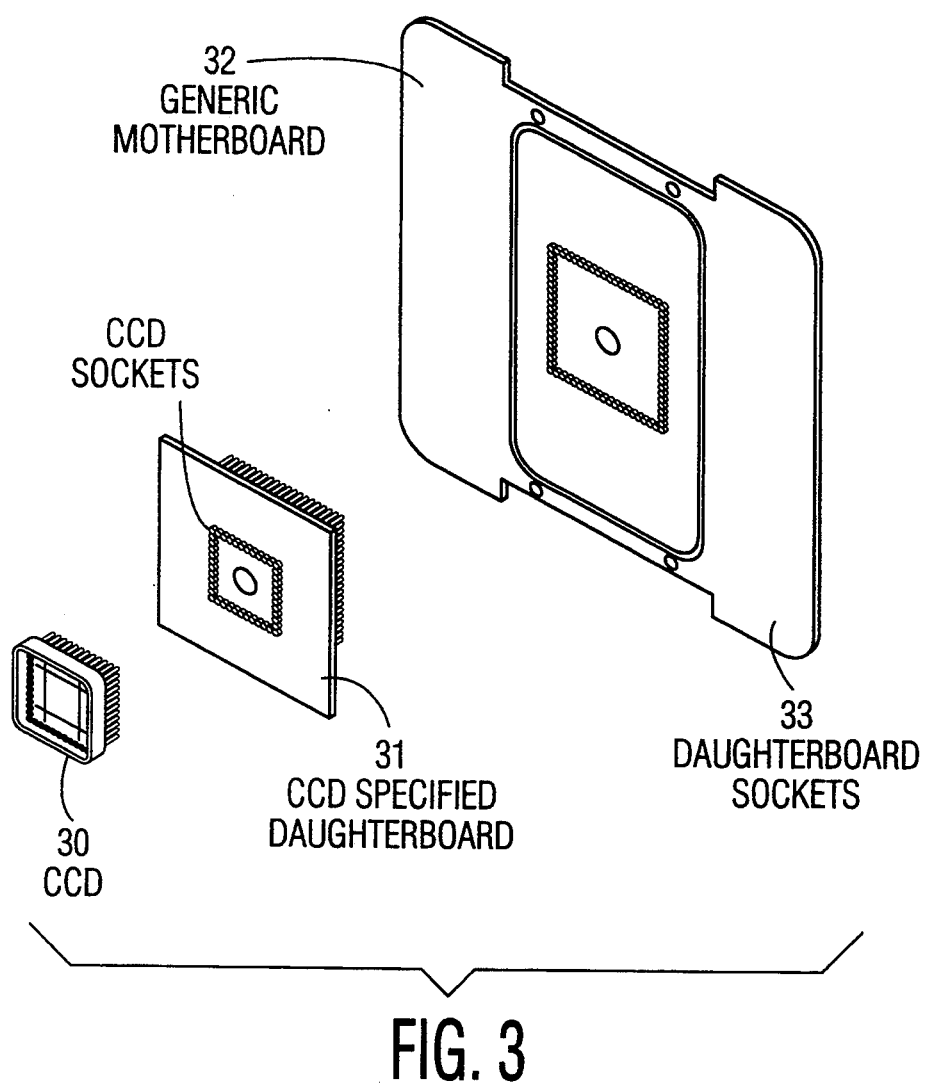
Fig.3 is a schematic view of a mother-daughter board arrangement for implementing a universal CCD pin arrangement.

FIG. 3 shows an embodiment in which a CCD subassembly 30 (15 of FIG. 1) plugs mates with a daughter board 31. The daughter board includes subterranean conductor traces configured to provide electrical paths for the necessary signals of the sixty available on mother board 16 of FIGS. 1 and 2. The generic mother board is designated 32 in FIG. 3 and the daughter board sockets are designated 33. Each daughter board in this embodiment includes traces unique to a particular CCD or set of CCDs.

The mother board (see FIG. 1) includes a plurality of slots 40 to provide thermal isolation.

The assemblage of components of FIG. 1, for example, is assembled by lubricating the O-rings with a common Silcone based grease and by bolting front plate 13 to vacuum chamber 19 via the O-rings on the front and back surfaces of board 16. The grease permits the components to seat against the O-rings. The assemblage then is baked to drive off water vapor and other gaseous contaminants. The resulting vacuum chamber is pumped down to about ten to the minus five TORR, during baking, via a commercial fitting (not shown) on the chamber.

Thermoelectric cooler 18 and cold finger 17 are juxtaposed with a cold block 45 (see FIG. 1) on which the CCD subassembly is mounted for providing the cooled CCD conditions necessary for low noise operation of the camera.

Thus, the realization that a printed circuit board with subterranean traces can be used with surface O-ring lands to accept abutting vacuum chamber piece parts in a manner to preserve a vacuum yet permit large numbers of electrical paths to penetrate the seal for accessing data and signal paths has lead to a modular CCD camera head configuration.

Such a configuration eases camera head replacement and repair costs. In order to take advantage of the flexibility permitted by such a design, a modular camera head includes memory for storing the characteristics of the associated CCD array and a "universal" camera body adapted to accept such modular heads includes means for interrogating the memory and storing the unique characteristics of the CCD for further operation.

What is claimed is:

1. Apparatus including a printed circuit board having a first and second surface and a plurality of layers therein, said board including at least one subterranean conductive trace, said layers including metallized through connections for contacting said traces electrically at specified positions in a central area, said traces terminating in a plurality of positions at the edge of said board for permitting electrical connection thereto, said board including on each of said first and second surfaces thereof a closed seat encompassing said central area for mating with a housing for forming a sealed chamber, said apparatus also including a housing mounted on each of said closed seats for forming a sealed chamber, said chamber including a CCD array imaging device, said device having a pin arrangement for mating with said metallized through connections.

2. A combination as set forth in claim 1 including a second printed circuit board, said second printed circuit board including a plurality of layers and having conductive traces therebetween, a first of said layers of said second printed circuit board also including through connections to associated ones of said traces for providing electrical connection thereto, said traces in said first printed circuit board having a pin out pattern for mating with said second printed circuit board and said second printed circuit board has a pattern for connecting to said first board and for accepting a specific CCD.

3. An apparatus as set forth in claim 1, said apparatus including a printed circuit board in combination with said sealed chamber comprising a camera head.

4. An apparatus as set forth in claim 2, said apparatus including a printed circuit board in combination with said sealed chamber comprising a camera head.

5. An apparatus as set forth in claim 1 wherein said printed circuit board includes a cold block and said apparatus also includes means for cooling said CCD via said cold block.

6. An apparatus as set forth in claim 2 wherein said printed circuit board includes a cold block and said apparatus also includes means for cooling said CCD via said cold block.

7. An apparatus as set forth in claim 1 including a cold block for mounting an electronic device for cooling.

* * * * *